Inventors:
Robert J. Mueller &
Ivan Burgeson

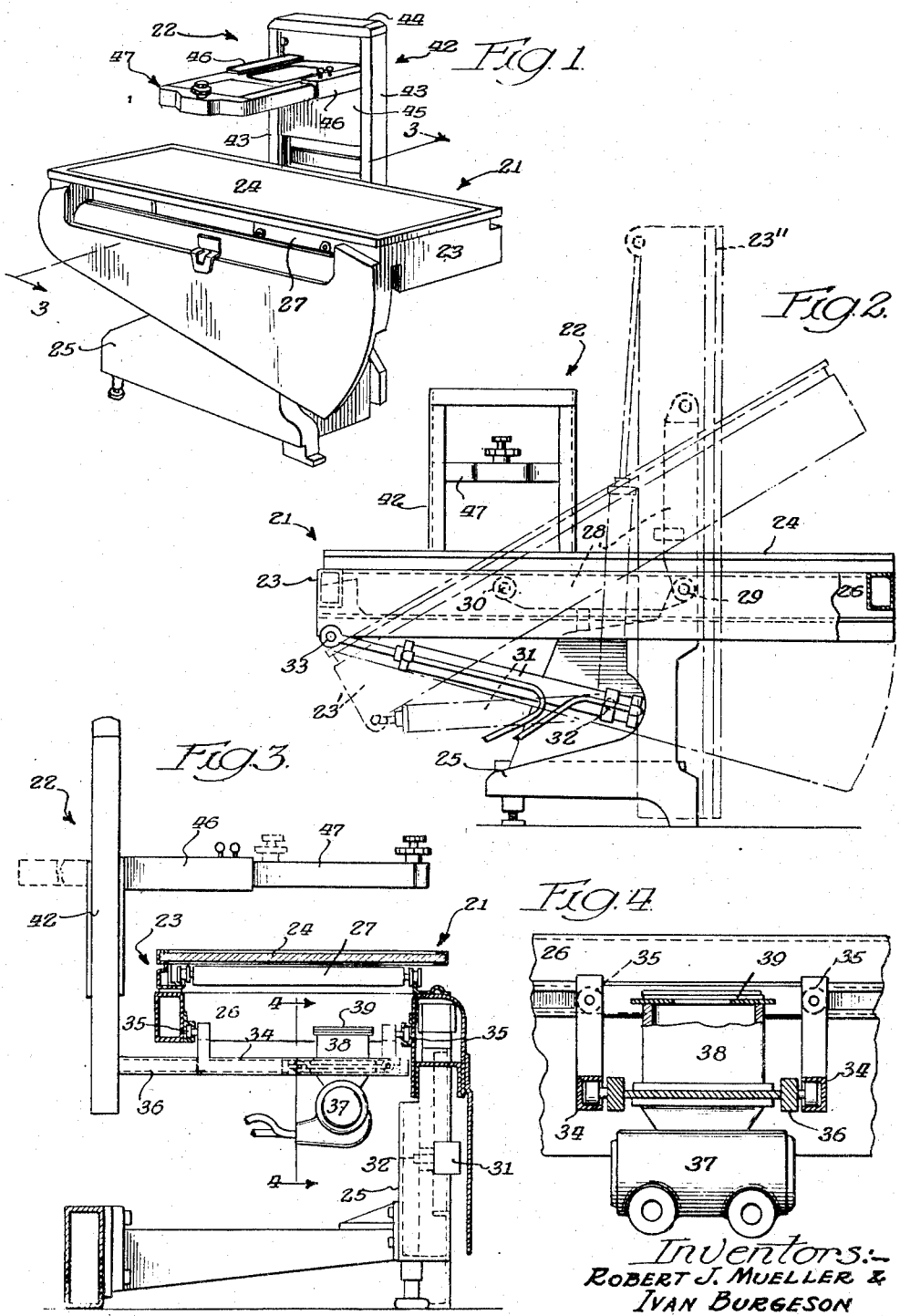

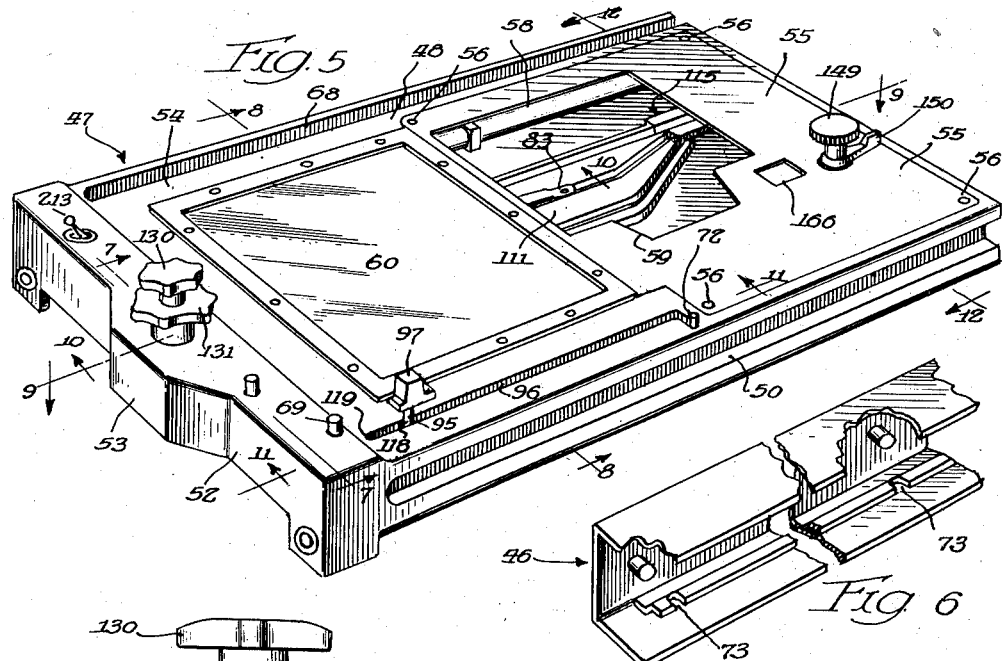
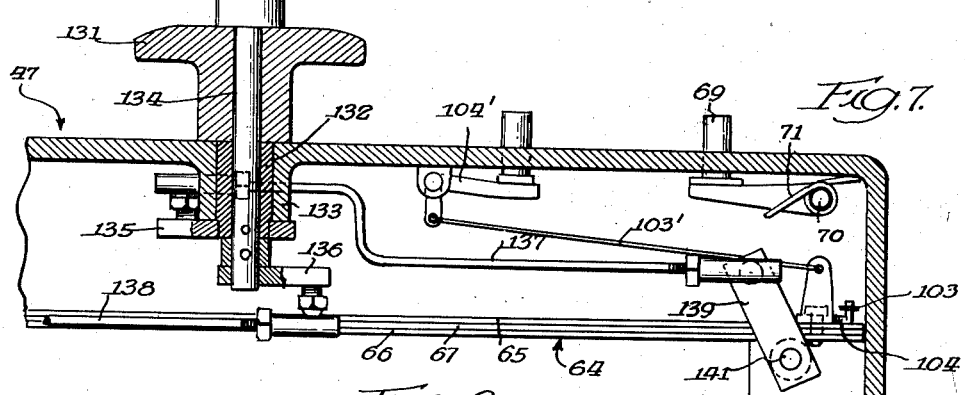
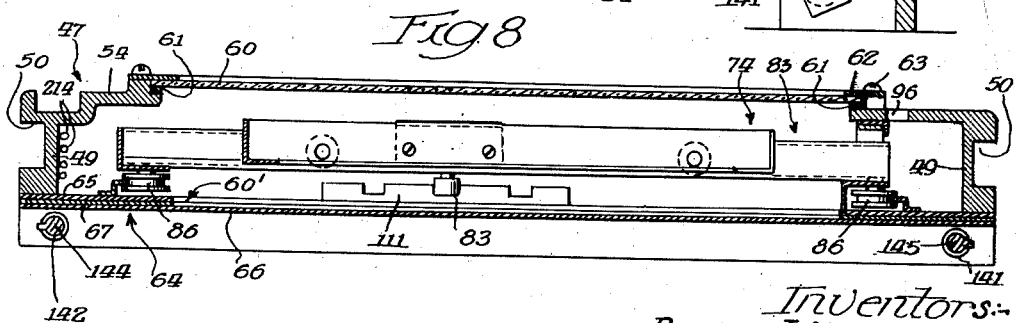

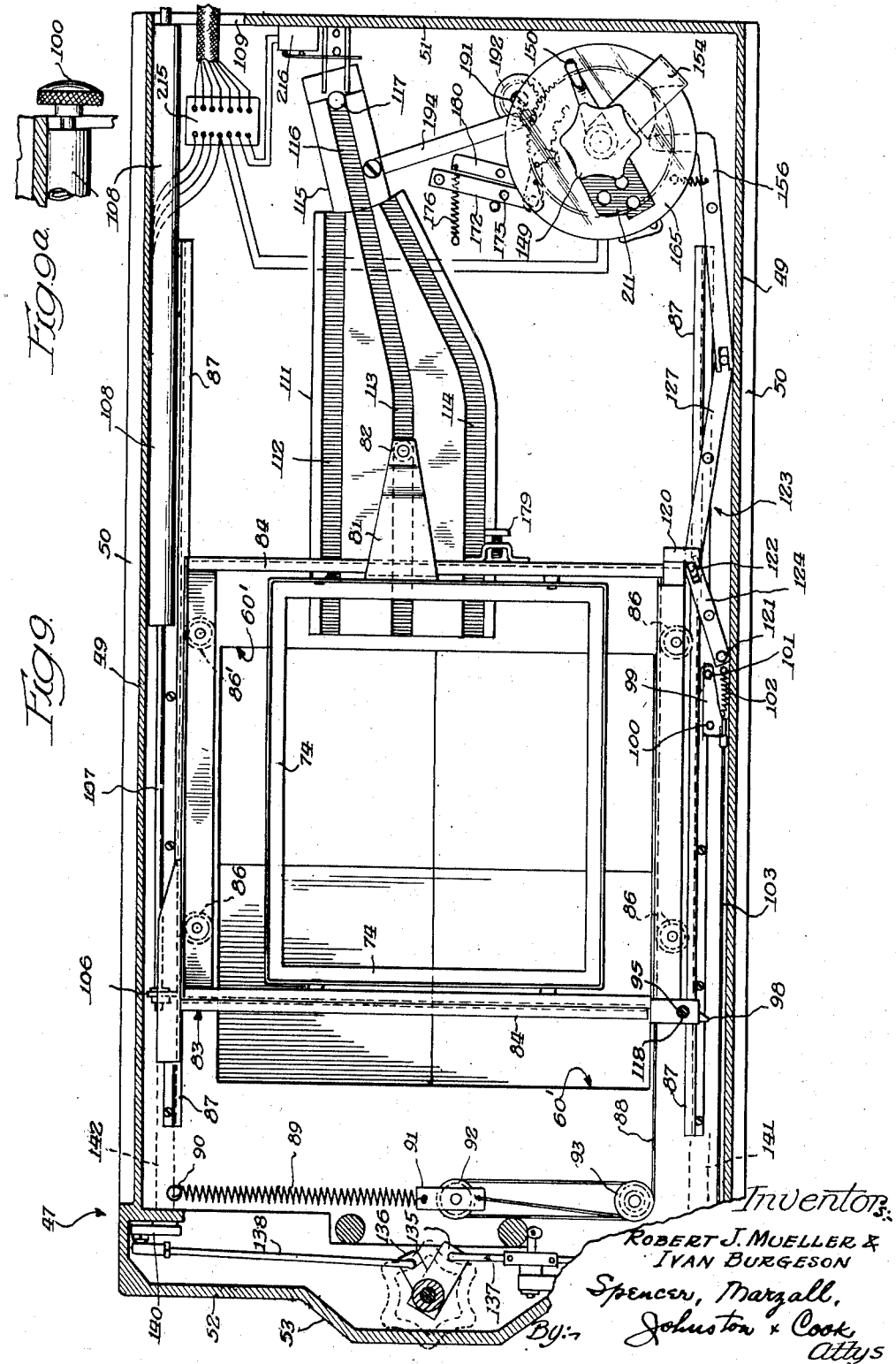

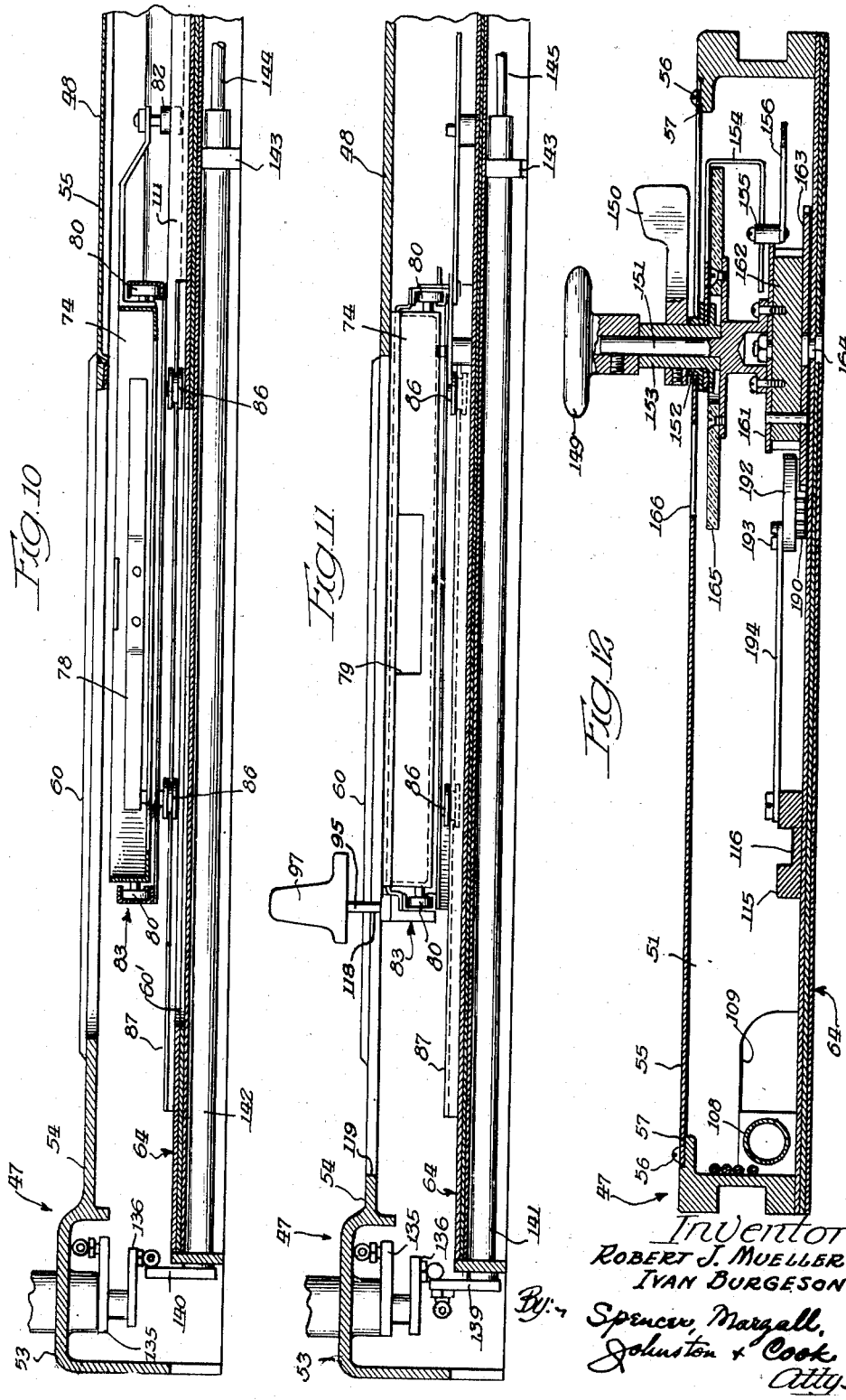

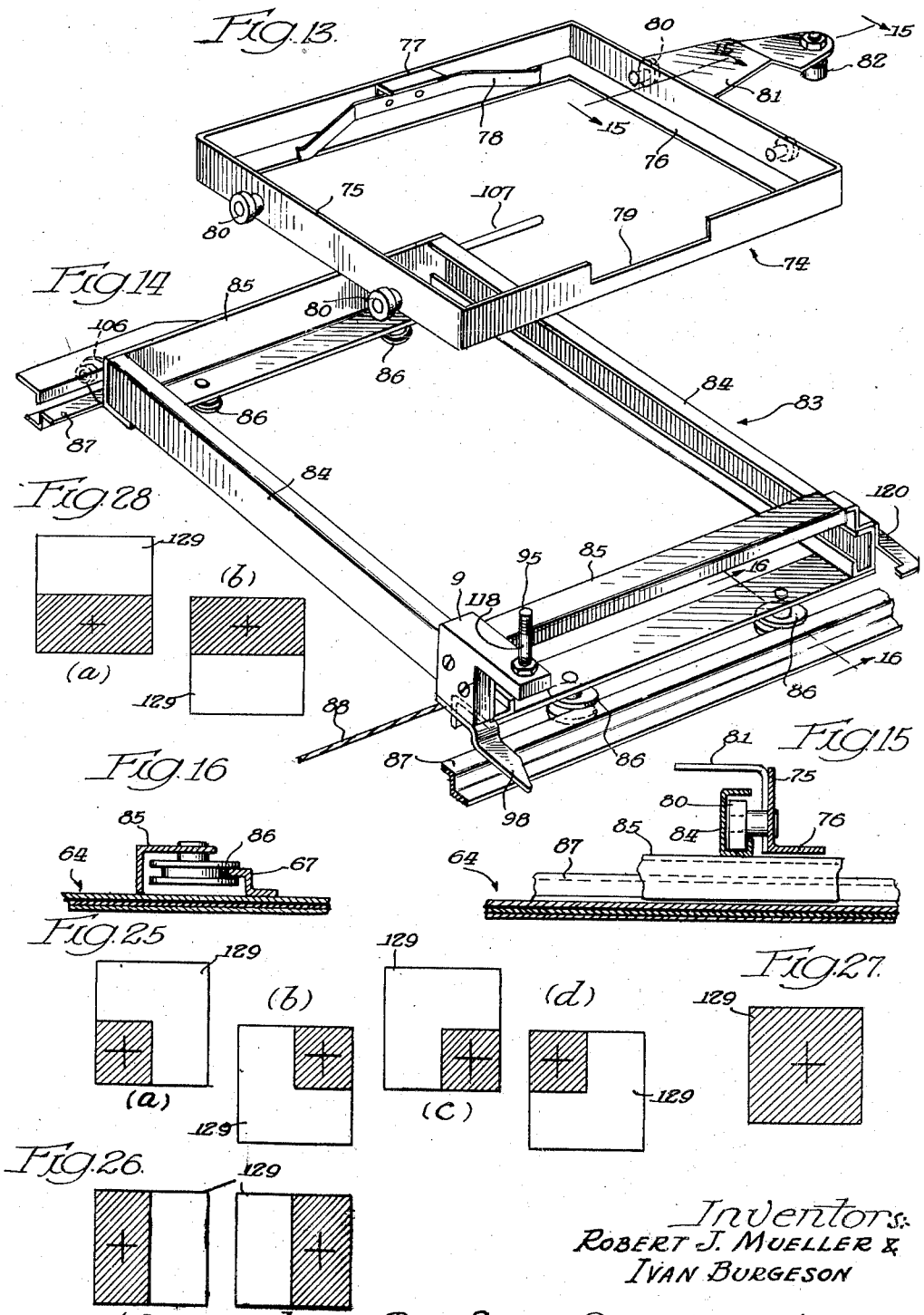

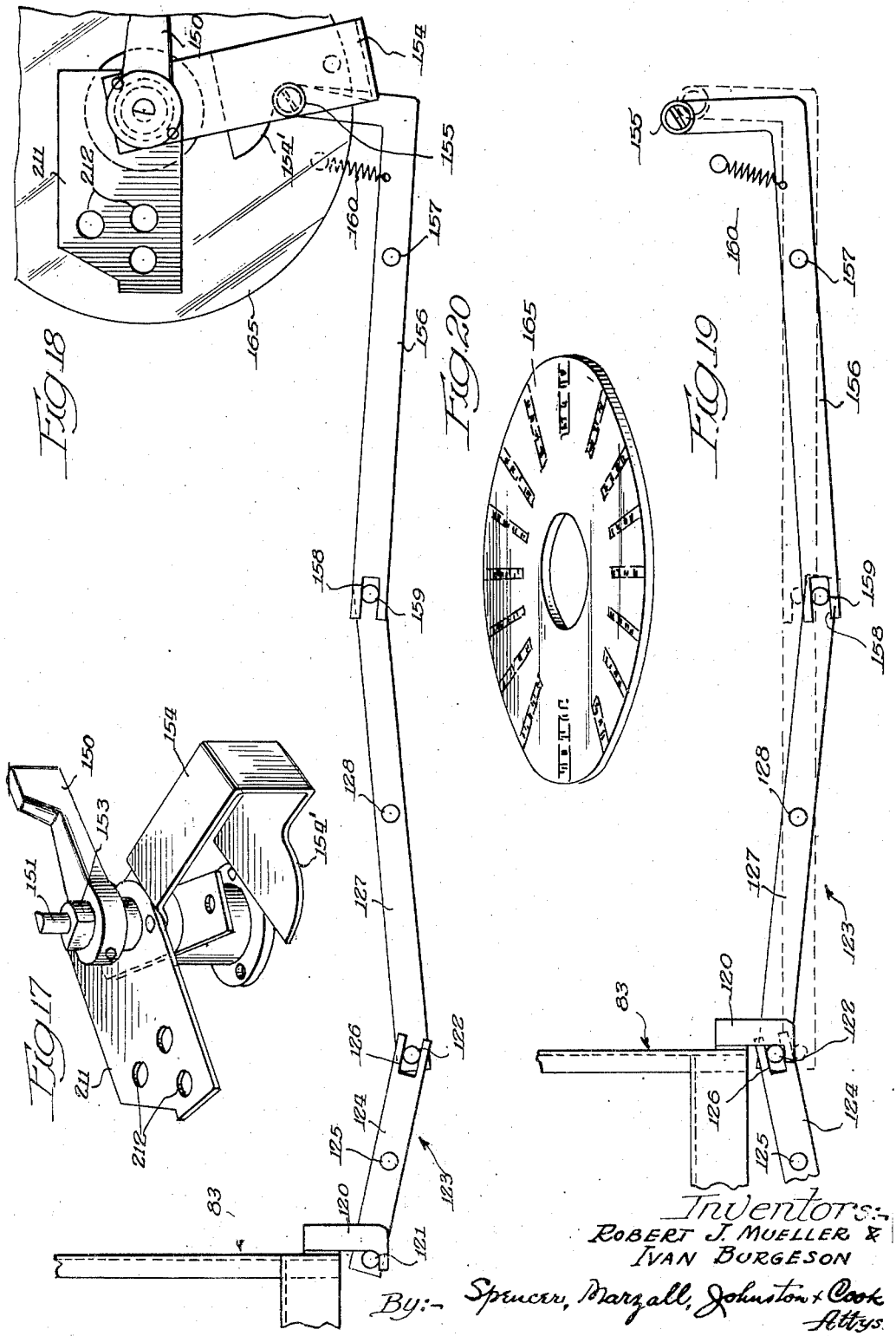

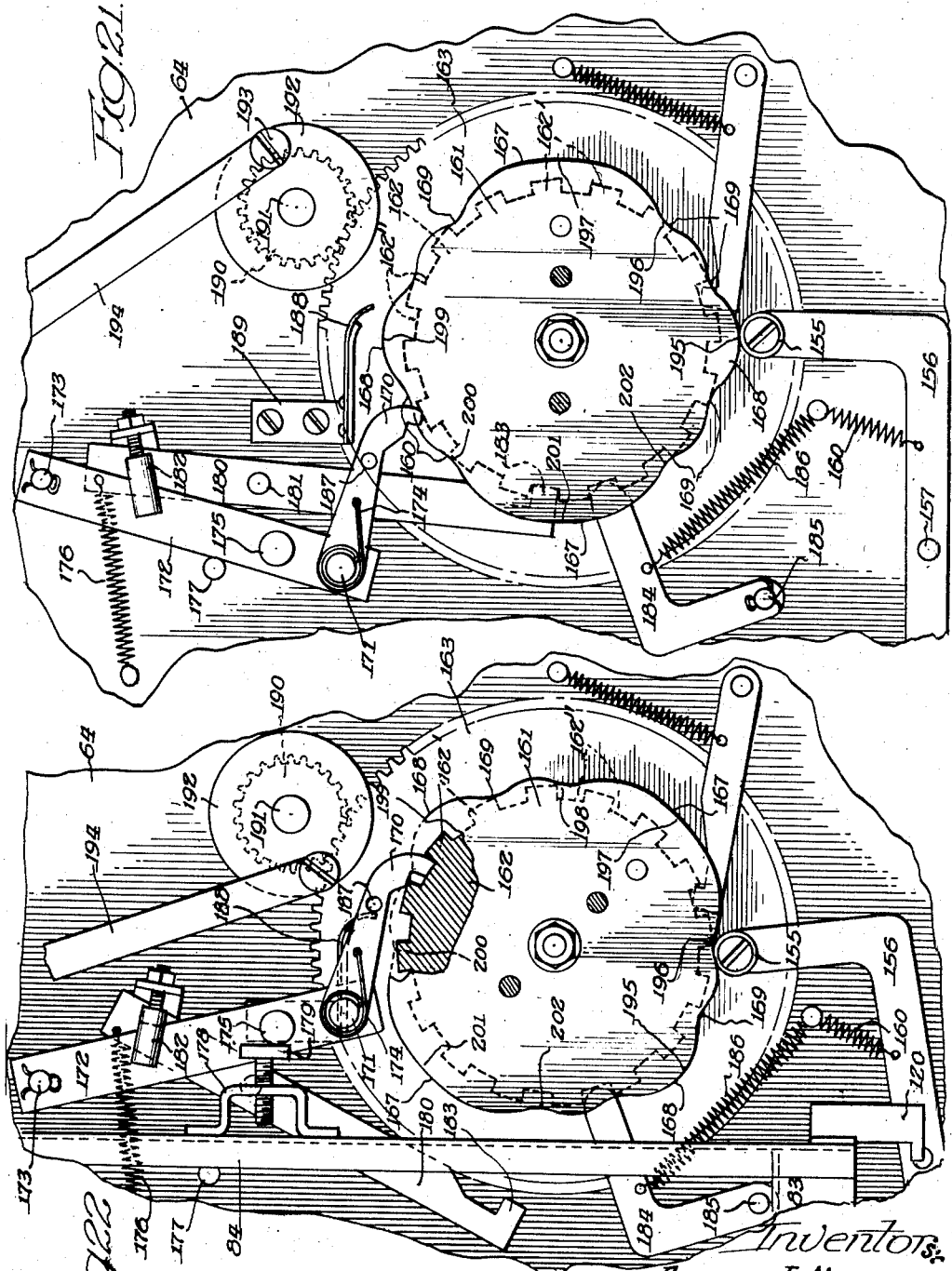

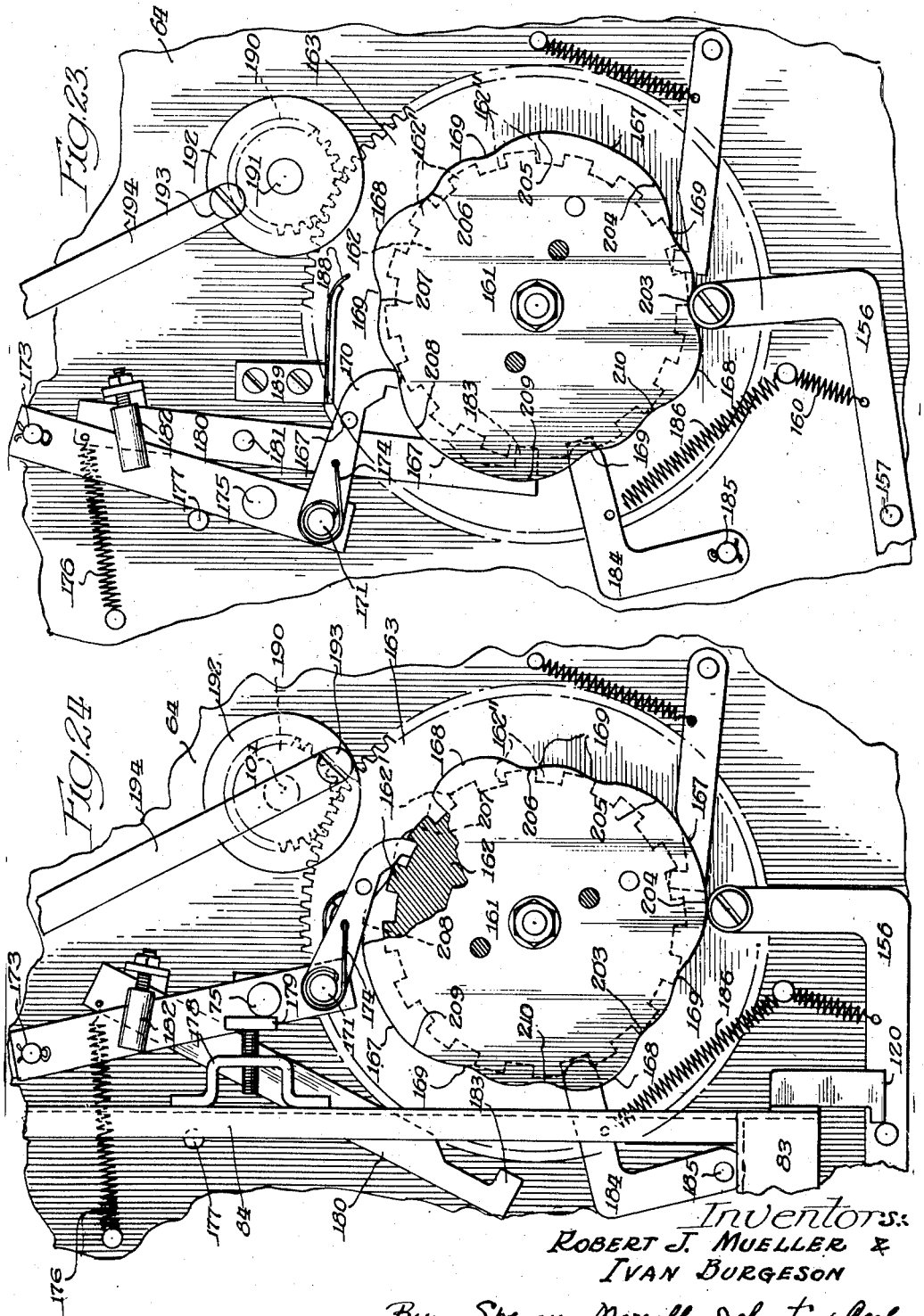

By:— Spencer, Marzall, Johnston & Cook
Attys.

Patented May 15, 1951

2,552,858

UNITED STATES PATENT OFFICE 2,552,858

SERIALOGRAPHIC APPARATUS AND X-RAY EQUIPMENT EMBODYING SAME

Robert J. Mueller, Milwaukee, and Ivan Burgeson, West Allis, Wis., assignors to General Electric X-Ray Corporation, Milwaukee, Wis., a corporation of New York Application November 3, 1949, Serial No. 125,282

18 Claims. (Cl. 250—58)

The present invention relates in general to X-ray apparatus, and has more particular reference to mechanism for supporting and shifting X-ray sensitive sheets or plates for use in radiography, that is to say, the making of X-ray shadow pictures on sensitive material.

An important object of the invention is to provide neat, compact, and relatively light weight apparatus for supporting X-ray sensitive material in position for exposure to X-rays in the making of X-ray photographs; a further object being to provide for shifting the supported material from a retracted to projected position for X-ray exposure; a still further object being to provide for shifting the supported material successively from retracted to a number of predetermined, relatively offset exposure positions to allow selected portions of a sensitive sheet or plate to be exposed successively.

A further object of the invention is to provide plate shifting apparatus which will accomplish the shifting operation rapidly and substantially without vibration or jar; a further object being to provide apparatus readily adjustable to accomplish any one of several possible shifting cycles.

Another important object is to provide apparatus of the character mentioned, which is of simple construction and light in weight, whereby the same may be readily supported, as on a diagnostic table, and easily manipulated and shifted to thereby facilitate the positioning of the apparatus in the making of X-ray photographs.

Another important object is to provide mechanism of the character mentioned, embodying a screen of material adapted to become luminescent upon exposure to X-rays, whereby to visually examine an object exposed to X-rays passing therethrough and impinging on the screen, in combination with normally retracted means operable at will to project X-ray sensitive material into registration with said screen for the purpose of making an X-ray photograph of an object substantially instantaneously, after viewing the same on said screen.

Another important object is to provide apparatus for progressively shifting a plate or sheet of sensitive material successively to a number of predetermined, relatively displaced exposure positions forming a plate shifting cycle; another important object being to provide mechanism selectively adjustable to shift a sensitive plate or sheet in accordance with a desired one of a number of different plate shifting cycles; a further object being to provide an apparatus which may be adjusted to present a plate in fixed position for over-all exposure, or to present the plate successively in position to expose each half of the plate, on opposite sides of its center line, or to present the plate successively in position to expose the several quarter sections of the plate.

Another important object is to provide mechanism operable to present a plate of sensitive material successively in a plurality of relatively shifted exposure positions, whereby to photograph several related pictures of an object upon adjacent portions of the same plate.

Another important object is to provide apparatus for successively projecting a plate carrier from retracted into exposure position, the apparatus being self-adjusting to successively present different portions of the plate in position for exposure.

Another important object is to provide a simplified, manually operable control cam for determining the desired operating cycle of the mechanism; a further object being to utilize successive retracting movements of the plate carriage to successively advance the cam for the successive control of carriage projection; a further object being to employ the progressively shiftable cam for controlling mechanism for determining the projected position of the plate carrier.

Another important object is to utilize a single control cam of relatively simple configuration for controlling the mechanism in the performance of its several possible cycles of operation.

Another important object is to provide means adjustable in accordance with the cycle selecting cam mechanism for regulating the size of an X-ray beam employed in exposing sensitive material in the apparatus.

Another important object is to provide mechanism for projecting sensitive material from retracted to exposure position along any selected one of a plurality of laterally offset projection paths; a further object being to provide a relatively shiftable gate under the control of a selector cam for guiding the plate carrier, during projecting movement thereof, into a selected one of a number of projection paths; a still further object being to provide selectively operable stop means, under the control of the said cam, to halt the plate carrier in any one of a number of longitudinally offset positions in said projection paths.

Another important object is to provide for latching the plate carrier in retracted position, and yielding means normally urging the carrier toward projected position upon release of such latching means, including adjustable dash-pot means for regulating the speed of projection of the carriage under the influence of said yielding means.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

Fig. 1 is a perspective and Fig. 2 a front view of X-ray apparatus embodying the present invention;

Figs. 3 and 4 are sectional views, respectively taken substantially along the lines 3—3 in Fig. 1 and 4—4 in Fig. 3;

Fig. 5 is a perspective view of plate shifting mechanism embodying the present invention;

Fig. 6 is a fragmentary perspective view of a support member;

Figure 29:
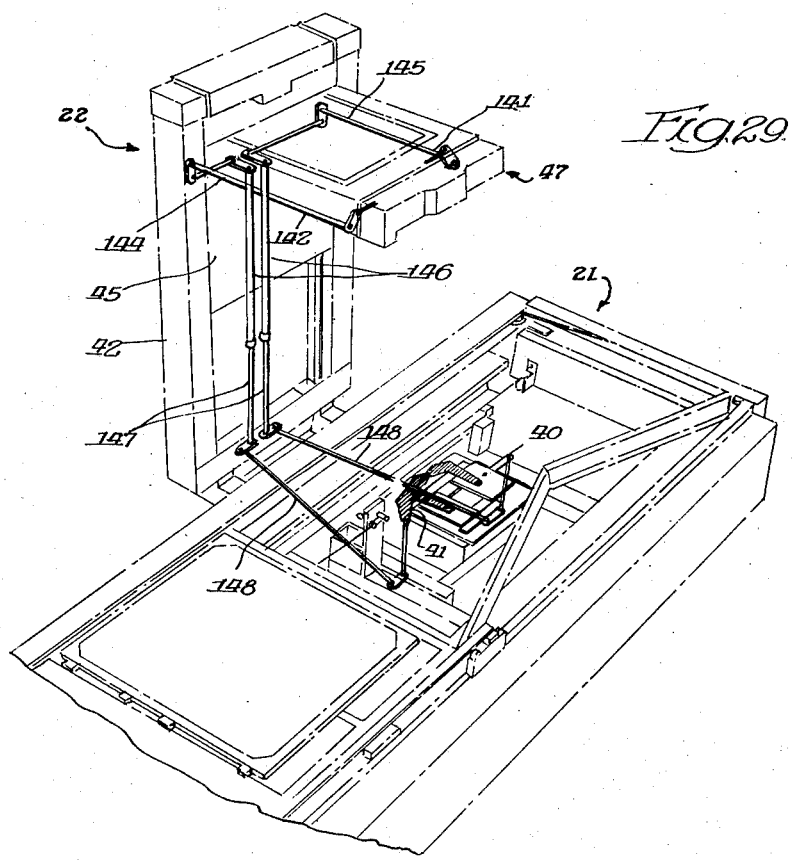
Figure 30:
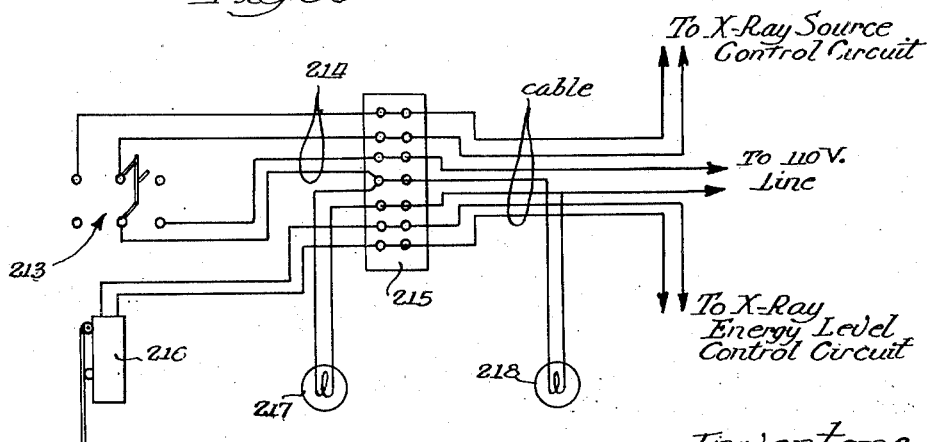

Figs. 7, 8, 9, 10, 11, 12, 15, and 16 are sectional views, respectively taken substantially along the lines 7—7, 8—8, 9—9, 10—10, 11—11, and 12—12 in Fig. 5, and lines 15—15 and 16—16 in Figs. 13 and 14;

Figs. 13 and 14 are perspective views showing carriage structure embodied in the mechanism;

Figs. 17 and 20 are views of portions of control mechanism;

Figs. 18 and 19 are top plan views showing an adjustable stop linkage in its several relatively shifted positions;

Figs. 21, 22, 23, and 24 are top plan views showing the control mechanism in several positions occupied by the parts during the operation of the mechanism;

Figs. 25, 26, 27, and 28 are diagrammatic views illustrating serialographic operation of the mechanism;

Fig. 29 is a phantom view of the apparatus, shown in perspective to illustrate a shutter control linkage; and Fig. 30 is a diagram of electrical circuits.

To illustrate the invention, the drawings show means 21 forming a support for an object to be examined, and means 22 for supporting a source of X-rays 37 and X-ray sensitive means on opposite sides of the supported object, whereby X-rays directed through the examination object, from the source, may excite the sensitive means to produce X-ray shadow pictures therein.

The X-ray sensitive means may comprise a fluorescent panel or layer 60, adapted to become visibly luminescent in response to X-ray excitation, whereby to provide a visible X-ray shadow picture of the object under examination, as well as X-ray sensitive photographic sheet material 129 adapted, upon X-ray exposure, to receive a latent photographic image of the examination object, such image being susceptible of subsequent development to produce a visible picture of the object in the sheet material.

The present invention contemplates the provision of means, substantially instantly operable, for selectively presenting either the fluorescent panel 60 or a photographic sheet 129 in position at a picturing station 60' for picture making purposes, including carriage means 74, 83, and cooperating stop means 119, 121, 122, for presenting the sensitive material in accurately centered position for picturing purposes at the picturing station. The invention further contemplates means 123 for the selective operation of the stops 119, 121, and 122, to determine the longitudinally projected position of the sensitive material at the picturing station; and the invention also contemplates the provision of selectively operable control means 115 for determining the relative position of the sensitive material, in a lateral direction, at the picturing station; including means for correlating the operation of the stops 119, 121, and 122, with the operation of the selector means, whereby to determine and obtain any desired laterally offset and longitudinally stopped relationship of the sensitive material in projected position at the picturing station.

The foregoing facilities allow for the presentation of any desired area, such as a quarter, or half, or all, of the sensitive sheet in accurately centered picturing position at the picturing station 60'. The so provided facilities thus allow for the making of a single picture on the centered sheet; or several successive pictures may be made in adjacent areas of a single sheet of sensitive material, by successively presenting such adjacent areas and exposing them to X-rays in centered position at the picturing station. The present invention, accordingly, provides for adjusting the sectional area of the X-ray beam in accordance with the area of the sensitive material to be exposed; and the invention also includes adjustable means operable to control the longitudinal position determining stops 119, 121, and 122, and the transverse position control means, so as to automatically cause the sensitive material to be presented successively, in one or more of a plurality of relatively offset positions, at the picturing station, as desired, in response to successive projections of the carriage means 74, 83, in presenting the sensitive material at the picturing station.

As shown more particularly in Figs. 1–3 of the drawings, the carrying means 22 may be mounted on the support means 21 and may serve to support the X-ray sensitive material 129 as well as the fluorescent screen 60 on one side of the examination object on the support means 21. The carrying structure 22 may also serve to support the X-ray source 37 in position to emit rays and direct the same upon the subject under examination, whereby to energize the fluorescent screen means or to expose the sensitive material in the making of X-ray photographs of the object under examination. It will be obvious, of course, that the X-ray source, if desired, may be mounted on other than the carrying means 22, although certain advantages and conveniences result from the mounting of the X-ray source on the carrying means 22, which also supports the screen means as well as the X-ray sensitive material.

The support 21, as shown, may conveniently comprise a tilting structure forming a table 23 having a top panel 24, on which an object to be examined may be disposed and supported for examination, the table 23 being preferably carried for tilting movement on a suitable support pedestal 25. The table and pedestal, and means for tiltingly adjusting the table on the pedestal, may comprise the structure illustrated and described in the co-pending application for U. S. Letters Patent, Serial No. 4,446, filed January 26, 1948, on the invention of Arthur J. Kizaur. The table structure thus may comprise a preferably rectangular frame 26 carrying a panel forming the table top 24. The table structure may also carry a film cassette and Bucky diaphragm carriage 27 on and movable longitudinally of the table frame immediately beneath the top panel. The frame 26 may be connected with the pedestal by means of a tilting link 28, pivoted on the pedestal as at 29, and on the table frame as at 30, to support the table for tilting movement with respect to the pedestal. Extensible table tilting means, preferably comprising a hydraulic cylinder and piston device 31, may be pivotally connected with the pedestal and the table frame, as at 32 and 33, as set forth in said co-pending application, Serial No. 4,446, whereby to move the table from the horizontal position, shown in Fig. 2, in either direction, to the tilted positions 23' and 23" shown in Fig. 2, and to secure the table in horizontal as well as in any relatively tilted position. Any other suitable table structure may, however, be employed.

It will be noted that the pedestal 25 preferably supports the table frame on one side thereof only, the opposite side being entirely free and unobstructed throughout the length of the table. The table frame thus may support a carriage structure 34 thereon, in position beneath the cassette carriage 27 for unobstructed movement longitudinally of the table frame between the opposite ends thereof, the carriage 34 being supported on suitable rollers 35 running in trackways mounted on and along the opposite side members of the table frame. The longitudinally movable carriage 34, in turn, may support, as by suitable rollers and roller trackways, a support frame 36, movable on the carriage frame 34 in a direction transversely of the table structure 23.

This support frame 36 may extend beneath end outwardly of the unobstructed side of the table frame 26 and may form a part of the carrying means 22. The frame 36, beneath the table structure, forms a convenient mounting for an X-ray source 37, which, in the illustrated embodiment, comprises an X-ray generating tube supported on and enclosed within a shockproof casing, which, in turn, is fastened on the frame 36 in position such that X-rays emitted by the tube, when the same is energized, may be directed vertically upwardly toward the table top panel 24. The frame 36, beneath the table structure, may also support a shutter box 38 vertically above the X-ray source, and through which rays are directed upwardly toward the top panel of the table.

The shutter box 38 may comprise material substantially opaque to X-rays, and formed with an open top fitted with shutters 39 for controlling the size of an aperture through which rays from the source 37 must pass. Preferably, four shutters are employed, two of which are adapted to open and close in a direction longitudinally of the table structure, while the remaining two shutters open and close in a direction transversely of the table, shutter operation being accomplished by suitable mechanism including actuating levers 40 and 41, respectively for operating the longitudinally and transversely movable shutters. By moving the levers 40 and 41, it will be apparent that the opening, which controls the sectional size of the beam of X-rays emitted from the source 37, may be adjusted at will to control the effective area covered by the beam when in operation for the fluoroscopic or radiographic examination of an object on the table top.

In addition to the frame 36, the carrying structure 22 may comprise an upright support frame 42 mounted on the frame 36 outwardly of the unobstructed side of the table frame 26, said support frame 42 extending upwardly of the table top panel 24. Said frame 24 may conveniently comprise a rectangular structure having spaced side members 43 and a top cross member 44, and one or more intermediate cross members for bracing, spacing, and rigidifying the frame 42. The side members 43 of the frame 42 preferably comprise channel members for receiving and guiding, as in suitable roller trackways, a support plate 45 for adjustable movement on and vertically of the frame 42 between the members 43. The weight of the plate 45 and mechanism carried thereby is preferably suspended on cables passing over pulleys mounted at the upper ends of the members 43, such cables being connected with suitable counterweights within the members 43, in order to support the plate 45 at any adjusted elevation in the frame 42. The plate 45 carries, at its upper end, a pair of channel members 46 which project in spaced, parallel, and facing relationship in position above the table top 24.

These members 46 serve to receive and support the opposite side edges of a shallow, generally rectangular casing 47 containing a fluorescent screen and a shiftable cassette carriage, whereby the screen or a cassette carrying material sensitive to X-rays may be disposed in position above the table top for X-ray excitation by rays emanating from the source 37 through the controlled aperture defined by the shutters 39, whereby to picture selected portions of an object carried on the table top for examination.

It will be seen from the foregoing that the casing 47 may be moved in the guiding and supporting channels 46 either to project the casing 47 to an operable position, as indicated in solid lines in Fig. 3, or to a retracted, inactive position, illustrated in dotted lines in said Fig. 3. The casing 47 may also be adjusted to any desired elevation above the table top by shifting the supporting plate 45 vertically in the frame 42. Likewise, the structure 42 and the casing 47 supported thereon may be moved laterally of the table top, within limits determined by the maximum relative movement of the frame 36 with respect to the frame 34; and the entire structure may be adjusted longitudinally of the table top within a range determined by the maximum displacement of the frame 34 on the table frame 26.

Accordingly, the fluorescent screen and the casette carriage mounted in the casing 47 may be adjusted for operation opposite any selected zone or portion of the table top 24, and at any desired elevation above the table top, to accommodate an object supported thereon for examination. It will be obvious, also, that by shifting the casing 47 to the retracted position shown in dotted lines in Fig. 3, and by moving the frame 42 on the carriage frame 34 in a direction transversely of the table structure, and outwardly of the unobstructed side thereof, the casing 47 and its supporting structure may be removed entirely from the vertical zone of the table top panel to leave the same entirely unobstructed.

The casing 47 may comprise a casting forming a rectangular frame 48, having lateral side walls 49 formed with outwardly facing longitudinal channels 50, a rear end wall 51, and a front end wall 52, preferably forming a bay 53 in its medial portions. The casing has a top wall 54, preferably formed integrally with the side walls, said top wall being cut away, except at the margins thereof, throughout substantially the entire area of the top wall, to provide an opening. The rear portions of said opening are covered by a panel 55, preferably of sheet metal, secured to the frame 48 as by means of suitable fastening screws 56, the frame being formed with a depressed seat 57 for receiving the edges of the plate 55. The plate 55 is provided with a preferably rectangular opening 58 having an extension 59 at one side of said opening, and through which opening access to the interior of the casing 47 may be had. The remaining portion of the top opening of the frame 48 is preferably rectangular, and means is provided along the edges of said remaining portion of the opening for a mounting seat for receiving and supporting the edges of a panel 60 forming a fluorescent screen, said screen being preferably supported on resilient gasket means 61 in its mounting seat, and being held in place on the frame 48 by suitable means, such as a holding frame 62 secured by fastening screws 63.

The open bottom of the casing 47 is closed by a preferably composite panel 64, comprising preferably an inner plate 65 of relatively rigid material, such as steel, an outer plate 66 of material such as aluminum, substantially transparent to X-ray penetration, and an intermediate plate or layer 67 of material such as lead, which is substantially opaque to X-rays. These layers extend substantially throughout the entire bottom area of the casing, except that the steel and lead layers only are cut away to form a rectangular opening 60' in vertical registration with respect to the fluorescent panel 60, so that X-rays penetrating upwardly through the bottom of the casing may impinge upon the panel 60 substantially without obstruction by the panel means 64. The X-ray opaque layer 67, however, extends in the remaining portions of the casing bottom, to exclude upward X-ray penetration outwardly of the edges of the panel 60; while the rigid panel layer 65, preferably of steel, affords strength and rigidity for the support, within the casing, of hereinafter described mechanism.

It will be seen from the foregoing that the casing 47 and its supports may be so arranged that, when the same is in the projected operating position in the members 46, and latched in place, the geometrical center of the panel 60 may be supported in vertical registration with respect to the X-ray source 37, regardless of the lateral and longitudinal adjustment of the carrying means 22 with respect to the table. As a consequence, by energizing the X-ray source 37 in any suitable, preferred, or conventional fashion, fluoroscopic examination of any portion of an object supported on the table may be accomplished merely by moving the carrying means 22, in order to dispose the X-ray source and the screen 60 in alinement with such portion of the examination object desired to be pictured on the screen.

To this end, the movement of the casing 47 between retracted and projected operating position may be controlled and determined by guide pins on the members 46 in position engaging and riding in the lateral grooves 50 formed in the side walls of the casing frame 48. To this end, also, the frame 48 may be provided with a longitudinal groove 68 formed in the top wall of the frame 48 along a side edge thereof. At its forward end, the frame may be provided with a latch control button 69, adapted to be pressed by the operator of the device in order to turn a shaft 70, suitably journaled on the frame 48, against the influence of a biasing spring 71.

The shaft 70 preferably extends within and along a side edge of the casing 47 from the forward end to the medial portions thereof where the shaft is drivingly connected with an upstanding latch finger 72, which may extend upwardly of the top of the frame 48 in position to latchingly engage spaced apart keeper notches 73 formed within one of the support members 46. The spring means 71 normally urges the latch finger 72 into latching engagement with one or other of the notches 73, so that when the latch finger is engaged in one keeper notch, the casing 47 may be latched in retracted position, and may likewise be latched in projected position when the latch finger is engaged in the other of said keeper notches. The finger, of course, may be released from latching engagement with either notch by operation of the push button 69, to thereby release the casing 47 for movement from retracted to projected position, and vice versa.

The casing 47 also contains mechanism for projecting and supporting X-ray sensitive material into position beneath the fluorescent panel 60, for the making of X-ray pictures of the object under examination on the table 23. Such mechanism comprises a cassette carriage 74 adapted to receive and support a cassette of any suitable, preferred, or conventional structure, providing a light-tight enclosure for X-ray sensitive material. Mechanism is provided for retracting and normally holding the cassette carriage 74 in retracted position opposite the opening 56, in the top panel 55 of the casing 47, in which retracted position a cassette may be loaded into or removed from the carriage 74 through the opening 58, the side extension 59 of the opening allowing access of the hand of the operator in placing the cassette in or removing the same from the carriage 74 in retracted position. The mechanism also provides for release and projection of the carriage 74 from retracted to picture making position beneath the screen 60, said mechanism further providing for the projection of the carriage 74 in various relatively shifted positions within the picture making area, to allow for the making of successive pictures in adjacent picturing areas of the cassette enclosed sensitive material in the carriage 74.

To these ends, the cassette carriage 74, as shown more particularly in Fig. 13 of the drawings, may comprise a rectangular frame formed of members having L-shaped sectional configuration, whereby the frame includes an upstanding peripheral wall 75 sized to receive a cassette, and an inwardly extending ledge 76 for engaging and supporting the marginal edges of the cassette. On one side the carriage 74 may be provided with an inwardly extending retaining flange or lip 77, beneath which an edge of the cassette may be engaged; and a leaf spring 78 may be mounted on the upstanding wall of the carriage beneath the lip 77 to resiliently hold the cassette in the carriage by normally urging it against the opposite side of the carriage frame, the medial portions of said opposite side being preferably cut away, as at 79, to reveal a side of a cassette in the carriage and allow the fingers of an operator access to said side, to facilitate removal of a cassette from the carriage when the same is in retracted position.

The cassette carriage 74, at each of its opposite ends, is provided with a pair of roller wheels 80; and the carriage, at one of said wheeled ends, is preferably provided with an outstanding actuating arm 81, formed at its end with a dependent cam following roller 82. Said arm 81 may conveniently comprise a formed strip of sheet metal welded or otherwise suitably connected on the end of the carriage.

The cassette carriage 74 is movably mounted in a sub-carriage 83 preferably constructed of sheet metal parts, including channel members 84 forming the opposite sides of the carriage 83, and cross members 85 bracing and interconnecting the opposite ends of the members 84. The rollers 80, at the opposite ends of the cassette carriage, are rollingly enclosed and received within the channel members 84 of the sub-carriage, which is preferably constructed so as to permanently interlock the rollers 80 in the roller trackways formed by the channel members 84. Accordingly, after assembly, the cassette carriage 74 may not be dismounted from the sub-carriage 83 without taking the same apart.

At its opposite ends the sub-carriage 83 is formed with dependent roller members 86 adapted for rolling engagement with spaced apart tracks 87, comprising sheet metal strips secured on the bottom panel 84 of the casing 47. The axes of the rollers 86 preferably extend vertically of the bottom panel, and the trackways 87 face mutually inwardly so that the sub-carriage 83, after assembly on the track members, is held against vertical displacement in the casing 47.

It will be seen from the foregoing that the cassette carriage structure, including the frame 74 and the sub-carriage 83, is movable longitudinally of the casing 47 by action of the rollers 86 on the tracks 87, while the casette carriage 74 is movable transversely by action of the rollers 80 in the track forming channels 84. By suitably controlling the longitudinal movement of the sub-carriage 83 and the transverse movement of the cassette carriage 74, any desired portion of a cassette enclosed layer of X-ray sensitive material may be centered in the exposure station; and by successively adjusting the relatively shifted position of the frames 74 and 83, various adjacent zones of a sensitive layer may be successively centered for exposure.

To this end, the sub-carriage 83, by means of a flexible cord or wire 88, may be connected with a preferably helical spring 89 in order to normally urge the sub-carriage 83 toward projected picturing position at the picturing station. The spring 89 at one end may be anchored on a pin 90 mounted on the bottom panel 64, at the forward end of the casing 47. The other end of the spring may be secured to a bracket 91, preferably carrying a pair of pulleys 92. The flexible cord 88 may be passed in succession around the pulleys 92 and a pair of pulleys 93 mounted on a pin secured on the bottom panel 64 of the casing, the end of the cord 88 being secured to the bracket 91.

The sub-carriage 83 is also fitted with a bracket 94, on which is fastened an upstanding stem 95 in position projecting through an elongated slot 96 formed longitudinally in the top of the casing 47, alongside of a side edge of the panel 60. The upper end of the stem 95 may be fitted with a convenient grasping handle 97, whereby manually to move the sub-carriage 83 from projected to retracted position against the influence of the spring 89. The bracket 94 may also be formed with an outstanding, preferably sheet metal finger 98 in position to engage a spring pressed latch 99.

This latch may comprise a bell crank lever turnably mounted on a pivot pin 100 secured on the bottom panel 64 of the casing. One arm of the latch may carry an upstanding pin 101 adapted to lie in the path of the latch finger 98, the latch member being normally urged, as by means of a spring 102, toward latching position, whereby the latch may yield to allow the finger 98 to pass the latch pin 101 as the sub-carriage 83 is moved to retracted position, the latch thereafter immediately returning to latching position to engage with the latch finger 98, and thus hold the mechanism in retracted or cocked position until release of the latch.

Any suitable means for releasing the latch may be provided. As shown, the latch member may be connected, as by a flexible cord or wire 103, with an actuating lever 104, pivoted on a pin on the bottom panel 64 of the casing, the lever 104, in turn, being connected, as by a flexible wire 103', with a second lever 104', pivotally mounted upon the under side of the top of the casing at the forward end thereof. A push button 105 may be provided for actuating the lever 104 to move the latch member 99 against the influence of the spring 102, whereby to release the sub-carriage 83, in retracted position, for movement toward projected position under the influence of the spring 89.

In order to regulate the speed of travel of the carriage 83 from retracted toward projected position, the same may be provided with a preferably sheet metal lug 106, to which, as by means of suitable clamping screws, may be connected a piston rod 107 extending longitudinally of the casing 47, and forming a part of an elongated air-dashpot comprising a cylinder 108 secured in the casing, as on the bottom panel 64 thereof. One end of the dashpot may extend in an opening 109 formed in the rear wall of the casing, the exposed end of the dashpot being fitted with a manually adjustable knob 110 for controlling the resistance of the dashpot to movement of the sub-carriage 83.

In order to control lateral movement of the cassette carriage 74 in a transverse direction on the sub-carriage 83, a cam track member 111, comprising a preferably metal plate formed with cam grooves 112, 113, 114, may be secured upon the bottom panel 64, said cam grooves being sized to guidingly receive the cam roller 82 on the cassette carriage. As the sub-carriage 83 is moved longitudinally between its projected and retracted positions, the roller 82 will ride in one or other of the grooves 112, 113, 114. The portions of said grooves occupied by the roller 82, when the carriage structure is in projected position, are preferably parallel and equally spaced, to thereby determine corresponding laterally shifted positions of the cassette carriage 74 on the sub-carriage. In the illustrated embodiment, the cam grooves are so spaced and arranged that the carriage 74 will be in centered position on the sub-carriage 83 when the roller 82 is engaged in the middle groove 113, as shown more particularly in Fig. 9 of the drawings; and the carriage 74 will be at the limits of its transverse movement, in one direction or the other, respectively when the roller 82 is in either the groove 112 or the groove 114, the parts being so arranged that one lateral half of the carriage 74, or its other lateral half, will be laterally centered at the picturing station as a result of engagement of the roller 82 in the groove 112 or 114.

In order to guide the roller 82 into a desired one of the grooves 112, 113, and 114, the rearward portions of said grooves converge radially toward a common transverse station, comprising a transfer block 115, having a groove 116 adapted to receive the roller 82 when the cassette carriage mechanism is in retracted position. This block 115 is rockably supported on the bottom panel 64 near the rear wall of the casing 47, the block 115 being rockable about the axis 117 toward which the rearward portions of the grooves 112, 113, 114 converge. The groove 116 extends from said axis to the swinging end of the block 115, which end is curved on a circle centering at the axis 117 in order to swing in abutting relationship with the similarly curved rear edge of the block 115, to which edge the grooves 112, 113 and 114 extend. When the cassette carriage structure is in retracted position, the roller 82 will extend in the groove 116 substantially in alinement with the pivot axis 117. Accordingly, the block 115, when the carriage structure is so retracted, may be adjusted to aline the slot 116 with any desired one of the grooves 112, 113 and 114, in order to select the slot into which it is desired to direct the roller 82. Thereafter, upon release of the latch 99, the projection of the carriage structure from retracted position will cause the roller 82 to enter the so selected one of the slots 112, 113, 114, to thereby cause the lateral adjustment of the carriage 74 in desired fashion on the sub-carriage 83, as the latter is moved toward projected position by operation of the spring 89.

From the foregoing it will be apparent that the above described cam and groove structure allows for the centered alinement, in the picturing zone, of a plurality of laterally displaced areas of cassette enclosed sensitive material mounted in the carriage 74. The present invention also provides for the central alinement, in the picturing zone, of longitudinally displaced portions of the sensitive material. This is accomplished by selectively operable stop mechanism for halting the projecting movement of the sub-carriage 83 at desired projected positions.

To this end, the carriage 83 may be formed to engage a stop shoulder on the frame 48 when the carriage 83 reaches a desired position of maximum projection, said position preferably being that in which the rearward longitudinal half of the carriage 74 is laterally centered at the picturing zone. The stem 95, in this connection, may serve as a stop lug 118, adapted to engage with the shoulder 119 at the end of the slot 96 to serve as such stop means to determine such position of maximum projection of the sub-carriage 83.

The sub-carriage 83 may also be provided with a stop lug 120 extending outwardly thereof, in position to engage selectively adjustable stop pins 121 and 122 on a turnably adjustable lever mechanism 123. Said lever mechanism may be adjusted to position either one or the other, or neither, of the pins 121 and 122 in carriage stopping position in the path of the stop lug 120. If the mechanism is adjusted so that neither of the pins is in carriage stopping position, projection of the carriage will continue until stopped by the action of the stem 95 serving as a stop lug 118 in cooperation with the shoulder 119. If, however, the mechanism is adjusted to present the pin 121 in carriage stopping position, projection of the carriage mechanism will be halted, preferably when the carriage 74 is centered at the picturing station. If, however, the mechanism is adjusted to present the stop pin 122 in the path of the lug 120, the carriage mechanism will be halted in the position shown more particularly in Fig. 9 of the drawings, in which the forward half of the carriage 74 is longitudinally centered at the picturing station.

As shown more particularly in Figs. 18 and 19, the stop pin 121 is preferably mounted at an end of a tilting lever 124, having its mid portions pivoted on an upright pin 125 secured to the bottom panel 64 of the casing. The end of the lever 124 remote from the pin 121 is formed with an open ended slot 126. The pin 122 is mounted on the end of a tiltable lever 127 in position engaging in the open ended slot 126, the lever 127 being rockably mounted on an upright pin 128 secured to the bottom panel 64 of the casing. The lever pivot pins 125 and 128 are preferably mounted on a line parallel with the trackways 87 which guide the movement of the sub-carriage 83, said pivots 125 and 128 being disposed slightly outwardly of the end of the stop lug 120 on the carriage 83.

Accordingly, when the levers 124 and 127 are disposed in position such that the axes of the stop pins 121 and 122 are in a common plane, including the axes of the pivot pins 125 and 128, the pins 121 and 122 are presented in position clear of the stop lug 120 so that the same will not engage the lug 120 and stop the projecting movement of the carriage 83, which accordingly, in such circumstances, may move to its position of maximum projection determined by the stop means 118 and 119. However, when the levers 124 and 127 are adjusted to either of the positions shown in Figs. 18 and 19, the pin 121 or 122 will be disposed in the path of the lug 120, and accordingly will stop carriage movement in the corresponding positions.

It will be seen from the foregoing that, by appropriately adjusting the selector block 115 and the lever 124, the cassette carriage 74, and consequently a cassette enclosed layer of sensitive material supported on the carriage 74, may be disposed in any one of a number of relatively shifted, yet accurately determined, positions at the picturing station. In the illustrated embodiment, nine such relatively shifted positions are provided, as follows:

| Carriage Position | Groove Occupied by Cam Follower 82 | Stops In Action |
|---|---|---|
| Fig. 25a | 112 | 122 |
| Fig. 25b | 114 | 119 |
| Fig. 25c | 112 | 119 |
| Fig. 25d | 114 | 122 |
| Fig. 26a | 113 | 122 |
| Fig. 26b | 113 | 119 |
| Fig. 27 | 113 | 121 |
| Fig. 28a | 112 | 121 |
| Fig. 28b | 114 | 121 |

Obviously, additional cam slots for lateral adjustment, and cooperating stop means for longitudinal adjustment, may be provided if desired.

It will be apparent, also, that by regulating the sectional area of the X-ray beam, as by suitably adjusting the control shutters 39, desired areas of the cassette enclosed light sensitive material may be exposed to X-light when in position at the picturing station. Figs. 25, 26, 27, and 28 illustrate various ways in which selected areas of a light sensitive sheet 129 may be subjected to X-rays for radiographic purposes.

In this connection, the four views (a), (b), (c), and (d) of Fig. 25 illustrate the successive exposure of the quarter section areas of a light sensitive sheet, by adjusting the sectional area of the X-ray beam to expose only a quarter section area of the sheet disposed in centered position at the exposure station, and by successively adjusting the mechanism to project the cassette carriage 74 successively into the four relatively offset positions indicated in Fig. 25.

The two views (a) and (b) of Fig. 26 illustrate the successive exposure of the longitudinal half section areas of a light sensitive sheet, by adjusting the sectional area of the X-ray beam to expose only a half section area of the sheet disposed in centered position at the exposure station, and by successively adjusting the mechanism to project the cassette carriage 74 successively into the longitudinally offset positions indicated in Fig. 26.

Fig. 27 illustrates the exposure of the entire sensitive sheet disposed in centered position at the picturing station by adjustment of the effective area of the X-ray beam, and by adjusting the mechanism to project the cassette carriage 74 to laterally and longitudinally centered position at the picturing station.

The two views (a) and (b) of Fig. 28 illustrate the successive exposure of the lateral half section areas of a light sensitive sheet, by adjusting the sectional area of the X-ray beam to expose only a half section area of the sheet disposed in centered position at the exposure station, and by successively adjusting the mechanism to project the cassette carriage 74 into the two laterally offset positions indicated in Fig. 28.

For convenience of adjustment of the shutters 39, manually operable means, comprising the operating handles 130 and 131, are provided at the forward end of the casing 47, as at the bay 53. These handles may conveniently be formed as coaxially mounted knobs. As shown, the handle 131 may comprise a knob fitted on a cylindrical stem 132 forming an axial channel therethrough, the stem being journaled in a suitable bearing 133 formed in the top of the casing 47 at the bay 53. The handle 130 may comprise a knob secured to a stem 134 journaled in the axial channel of the knob 131 and its cylindrical stem 132. The ends of the stems 132 and 134 may project within the bay 53, and may be fitted, respectively, with lever arms 135 and 136. The lever arms may be connected, as by means of connecting rods 137, 138, respectively with radially extending arms 139, 140, with hollow shafts 141, 142, suitably journaled in the forward ends of the casing 47 and extending thence rearwardly along and beneath the opposite sides of the casing, to and suitably journaled on said casing bottom, as at 143, substantially midway between the front and rear ends of the casing. The hollow shafts 141 and 142 enclose stems 144, 145, with which they have splined driving engagement, so that the stems may telescope within the shafts 141 and 142 to any required extent, while maintaining driving engagement therewith, whereby the stems may be turned in either direction by operation of the handles 130 and 131.

As shown more particularly in Fig. 29, the stems 144 and 145 extend to and are journaled in suitable bearings formed in the vertically movable plate 45 on the frame 42; and the stems 144 and 145, by means of suitable driving linkages, are connected to drive corresponding hollow shafts 146, suitably journaled on the plate 45. These shafts 146 extend vertically and have sliding and driving relationship with corresponding stems 147 mounted telescopically within the shafts 146 and having sliding spline engagement therewith. The stems 147 extend to the lower end of the frame 42 on which they are journaled, said stems having lever arms at their lower ends, respectively connected with corresponding driving rods 148. These rods 148, in turn, extend to and are drivingly connected respectively with the shutter actuating means 40 and 41, in order to adjust the same.

Accordingly, by operating one or other of the handles 130, 131, either the lateral or longitudinal dimension of the sectional area of the X-ray beam may be adjusted to obtain a desired effective area of the X-ray beam at the exposure station. If desired, suitable index means may be provided in conjunction with the operating handles 130 and 131 to indicate the required adjustment to obtain the desired effective area of X-ray beam at the picturing station.

Manually operable selector means, controlled by a convenient operating knob 149 and lever 150, may also be provided for determining the sequential selection of projected positions of the cassette carriage 74. To this end, the handle 149 may comprise a knob fitted on an upright stem 151 which projects through a suitable opening formed in the cover plate 55, said opening forming a bushing 152. The stem 151 is turnably journaled in a sleeve 153 which, in turn, is journaled in the bushing 152, said sleeve carrying the manually operable lever 150 thereon. The bushing 152 extends beneath the cover plate 55 and carries a radially extending lever arm 154, having an end formed with a cam edge 154′ in position to engage a roller bearing element 155 on a lever 156.

The lever 156, as shown in Figs. 18 and 19, is preferably mounted on a support pivot 157 on the bottom panel 64 of the casing. The axis of the pin 157 is preferably in a common plane with the axes of the pivots 125 and 128, the lever 156 being formed at its end with an open ended slot 158 adapted to receive a pin 159 on the end of the lever 127 remote from the stop pin 122. The lever 156 is normally biased, as by means of a spring 160 connected therewith and with the bottom panel 64, to normally urge the interconnected levers 124, 127, and 156 toward the position shown in Fig. 19, in which the stop pin 122 is presented in position to stop the cassette carriage. By operation of the handle 150, however, the cam 154′ may be caused to shift the lever 156, and the levers 124 and 127 connected therewith, against the influence of the spring 160, to the position shown in Fig. 18, in which the stop pin 121 may be presented in position to stop longitudinal travel of the carriage structure in order to obtain the longitudinally centered positions required for exposures of the sort shown in Figs. 27 and 28.

Accordingly, it will be noted, the position of the lever 150 will determine the longitudinal dimension of the area of the sensitive material to be exposed. If the lever 150 is adjusted to engage the cam 154′ with the roller 155, thereby adjusting the levers 124, 127, and 156 to the position shown in Fig. 18, the longitudinal dimension of the area of the sensitive sheet to be exposed will be the entire longitudinal area of the sheet. If the handle 150, however, is adjusted to release the cam 154′ from the pin 155, to thereby free the levers 124, 127 and 156 to assume either the full line or dotted line position shown in Fig. 19, the mechanism will be thus conditioned to allow selection of an exposure area dimension other than the entire longitudinal area of the sheet. When so conditioned, other and hereinafter described mechanism may be caused to actuate the lever system 123, in order to position the same either as shown in full lines, or as shown in dotted lines in Fig. 19, whereby to obtain X-ray exposure of sensitive material areas in the manner indicated in Figs. 25 and 26.

This is accomplished by mechanism controlled by the handle 149 and the stem 151 with which the handle is connected. To this end, the stem 151 below the cover 55 is drivingly connected with a structure including a cam disk 161, an index wheel 162, and a gear wheel 163. The cam disk preferably comprises a sheet metal plate having a peripheral edge configurated to form a driving cam. The index wheel is preferably formed of suitable plastic material, and has equally spaced projections 162' and intermediate depressions 162'' of preferably rectangular sectional shape, formed in and around its peripheral edge, as shown more particularly in Figs. 21-24. The gear wheel 163 preferably comprises a metal plate formed with uniformly spaced peripheral teeth. The cam plate, index wheel and gear wheel are preferably secured together in stacked concentric relationship, and are secured on the stem 151 in coaxial relationship therewith. The assembly, comprising the gear and index wheels and the cam plate, is preferably journaled on a suitable bearing stud 164 mounted on the bottom panel 64 of the casing, whereby said assembly, by operation of the handle 149, may be turned to any desired position of angular adjustment on the stud 164. The stem 151 may also carry an index plate 165 secured thereto, said index plate preferably comprising an annular disk coaxially mounted with respect to the stem 151 and supported immediately beneath the cover 55 in position to be revealed through a suitable opening 166. The plate 165 may be marked to indicate the adjusted angular position of the cam and wheel assembly.

The edge of the cam 161 is disposed in position to engage the roller 155 of the lever 156, except when the same is retracted by operation of the handle 150. Accordingly, the cam 161, when rotated, may serve to adjust and determine the positions of the lever system 123 shown in dotted lines in Fig. 19. To this end, the configurated edge of the cam includes high lands 167, 168, adapted to present the lever system 123 in the straight position indicated in dotted lines in Fig. 19, and intermediate hollows or depressions 169 adapted to present the lever system 123 in the relatively bent position shown in solid lines in Fig. 19. Accordingly, whenever the roller 155 is engaged by a high land 167 or 168, the sub-carriage 83 will be stopped in its position of extreme projection determined by the stop 119, as required in exposing sensitive material in the manner indicated in Figs. 25(b), 25(c), and 26(b). When the roller 155 engages a depression 169, the carriage 83 will be stopped in position determined by the stop pin 122, as required in exposing sensitive material in the manner indicated in Figs. 25(a), 25(d), and 26(a).

Means, operable in response to the retraction of the sub-carriage 83 to retracted position, is provided for advancing the cam and wheel assembly, in order automatically to determine the required adjusted position of the cassette carriage 74, when next projected.

To this end, as shown more particularly in Figs. 21-24, a pawl member 170 is provided for turning the index and wheel structure, said pawl having a driving finger adapted to enter the depressions 162'' and engage the projections 162' of the index wheel in order to turn the same. The pawl member 170 is pivotally mounted, as on a pin 171, at the end of a lever 172, the other end of which is pivoted, as on a pin 173, mounted on the bottom plate 64 of the casing. Spring means 174 is arranged to normally urge the pawl member 170 on its pivot 171 to engage its finger with the edge of the index member 161. Intermediate the pins 171 and 173, the lever 172 is provided with a pin 175 forming an actuating abutment. Spring means 176 may be indirectly connected with the lever 172 to normally urge it toward a retracted position, shown in Figs. 21 and 23, such retracted position being determined by engagement with a stop pin 177, which may conveniently be mounted on the bottom panel 64 of the casing. A side member 84 of the carriage 83 is preferably provided with a bracket 178 carrying an adjustable member 179 in position to engage the actuating pin 175 as the carriage 83 approaches its fully retracted position, whereby to move the lever 172 and the pawl 170 in a direction to turn the index wheel 162, as shown more particularly in Figs. 22 and 24 of the drawings. It will be seen that the index wheel, in the illustrated embodiment, will be moved one-eighth of a revolution, in a clockwise direction viewing Figs. 21-24, as the result of an operating stroke of the lever 172, each time the carriage 83 is returned to retracted position after having been projected.

Associated with the lever 172 is a latching lever 180, pivotally supported on a pin 181 secured on the bottom panel 64 of the casing, the biasing spring 176 being connected with the lever 180 on one side of the pivot pin 181, and the levers 172 and 180 being interconnected, as by means of a tying link 182. The remote end of the lever 180 may be formed with a detent 183 adapted to engage in the depressions 162'' of the index wheel, in order to hold it in adjusted position whenever the driving pawl 170 is inactive in retracted position. Because of its linked connection with the lever 172, the holding lever 180 will be retracted from engagement in a notch 162'' as the lever 172 commences its operating stroke under the driving influence of the carriage 83 in approaching the fully retracted position of said carriage; and the holding lever will return to latching position in a notch 162'' as and when the lever 172 returns to its inactive retracted position following release of the carriage structure.

In order to prevent retrograde movement of the index wheel 162, a holding pawl 184 may be provided. This pawl may be pivotally supported on a pin 185 on the panel 64 and normally urged, as by means of a spring 186, into engagement with the edge of the index wheel. When the carriage 83 is moved to retracted position, by means of the handle 97, the pawl 170 will occupy the projected position shown in Figs. 22 and 24. Upon release of the handle 97, the carriage may move a short distance forward until stopped in cocked position by the action of the latch means 98, 101. The pawl 170 is provided with a dependent guide pin 187 adapted, during retraction of the pawl, to ride upon a guide cam 188. This guide cam preferably comprises a bent member of springy material mounted on a bracket 189 secured on the panel 64, the guide member 188 serving to lift the driving end of the pawl from the edge of the index wheel 162 as the carriage moves forward from fully retracted to cocked position. So long as the mechanism remains in cocked position, the pawl 170 will remain in projected position but lifted from the edge of the wheel 162, by the cam 188, to allow rotary adjustment of the selector means while the carriage is in retracted and cocked position. Upon release of the latch means 98, 101, for projecting movement of the carriage 83, the pawl 170, under the influence of the spring 176, will be returned along the cam 188 to the inactive position shown in Figs. 21 and 23.

It will be noted that the gear wheel 163 is fast with the index wheel 162 and the cam plate 161, and accordingly turns therewith. This gear wheel drivingly engages and serves to turn a pinion gear 190, which is journaled on a stub shaft 191 mounted on the panel 64, outwardly of the periphery of the gear 163. The pinion 190 is secured to a disk 192 carrying a crank pin 193 spaced from the axis of the pinion gear 190, the pin 193 being drivingly connected with the selector block 115 by means of a connecting rod 194. Radial spacement of the axis of the crank pin 193 from the turning axis of the gear 190 is such that the selector block 115 will be rocked on its pivot 117 between the limits of its rocking movement, as the result of one complete revolution of the pinion gear 190. The gear ratio between the driving gear 183 and the pinion gear 190, in the illustrated embodiment, is as four is to one, so that the pinion gear 190 will make a half revolution on its pivot as the result of each operating stroke of the pawl member 170, which turns the index wheel and the connected gear wheel 163 one-eighth of a turn.

As a consequence, the selector block 115 will be rocked from and returned to position with its guide slot 116 in alinement with the groove 113, as the result of each stroke of the pawl 170, providing the index and gear wheels 162 and 163 are in the relatively adjusted position illustrated in Figs. 21 and 22, as determined by adjustment of the knob 149. If, however, the index and gear wheels 162 and 163 are in the adjusted position illustrated in Figs. 23 and 24, the selector block 115, as the result of each operating stroke of the pawl 170, will be rocked from a position in which the guide channel 116 is in alinement with one of the grooves 112, 114, to a position in which said guide slot 116 is in alinement with the other of said grooves 112, 114. In other words, the knob 149 may be operated to condition the selector mechanism either to guide the cam follower 83 successively into the guide groove 113, or to guide said cam follower alternately into the guide grooves 112 and 114.

It will be seen that the cam 161 is configurated so as to present the stop pin 122 selectively in or out of active carriage stopping position as the result of the operating stroke of the pawl 170. As specifically illustrated, the pin 122 is presented in stopping position whenever the cam 161 is in position to receive the cam following roller 155 in a depression 169. The pin 122 will be held out of carriage stopping position, by presentation of the lever system 123 in the straight relationship shown in dotted lines in Fig. 19, whenever the cam 161 is presented in position to engage the cam following roller 155 with a high land cam portion 167 or 168. Since the cam is advanced one-eighth of a revolution as the result of each operating stroke of the pawl 170, it will be seen that the sequential operation of the stop pin 122 may be caused to occur in desired sequence, depending upon the adjustment of the handle 149.

If the selector apparatus is adjusted to the position indicated in Figs. 21 and 22, it will be seen that the cam following roller 155, from the starting position shown in Fig. 21, will successively engage the cam at the stations marked 195, 196, 197, 198, 199, 200, 201, and 202. As a consequence, the pin 122 will alternately be presented in carriage stopping position as the roller 155 engages cam stations 196, 198, 200, and 202; and the pin 122 will be held in retracted position as the roller 155 engages the cam stations 195, 197, 199, and 201. However, when the mechanism is adjusted as shown in Figs. 21 and 22, the selector block 115 is alined with the groove 113 in each indexed position occupied by the cam during rotation thereof by the pawl 170. Accordingly, when the mechanism is adjusted as shown in Figs. 21 and 22, successive stroke cycle operation of the carriage structure will cause the cassette carriage 74 to be presented at the picturing station in the transversely centered position determined by the groove 113, and alternately in longitudinally stopped position determined by the pin 122 or by the stop means 118, 119, when the pin 122 is held in retracted or inactive position by engagement of the roller 155 with the cam 161 at the stations 196, 198, 200, and 202, that is to say, the projected positions required for the exposure to X-rays of light sensitive material in the manner indicated in Fig. 26.

Exposure of light sensitive material to X-rays in the manner illustrated in Fig. 27 may also be accomplished by adjusting the control handle 149 to set the mechanism to the condition illustrated in Figs. 21 and 22, and by then operating the handle 150 to disengage the roller 155 from the cam 161 and to present the pin 121 in stopping position. When the mechanism is so adjusted, the action of the gate 115 to successively aline the slot 116 with the groove 113, and the permanent presentation of the stop pin 121 in stopping position, will assure projection of the cassette carriage 74 at the picturing station in laterally and longitudinally centered position.

The selector apparatus, however, may be adjusted, by means of the handle 149, to the relative position illustrated in Figs. 23 and 24. When so adjusted, successive action of the pawl 170, in turning the index wheel 162 through one complete rotation, will cause the cam following roller 155 to successively engage camming stations 203, 204, 205, 206, 207, 208, 209, and 210, which are displaced on the cam with respect to the stations 195—202. It will be seen that the stations 204, 205, 208, and 209 are located on the high lands 167, as also are the stations 197 and 201, the stations 195 and 199 being also high land stations comprising the lands 168. The remaining stations 203, 206, 207, and 210, and also the stations 196, 198, 200, and 202, are stations formed at the cam depressions 169.

As a consequence of the configuration of the cam, when the structure is adjusted as shown in Figs. 23 and 24, the stop pin 122, during rotation of the index wheel 162 by successive action of the pawl 170, will be presented in active carriage stopping position during two successive projections of the carriage structure, and then will be held in retracted or inactive position during two successive carriage projections, and so on, for as long as the mechanism remains in the adjusted position shown in Figs. 23 and 24. The selector bar 115, however, will move alternately into registration with the grooves 112 and 114. As a consequence, the cassette carriage 74, during successive projections thereof, may be guided successively into projected position determined by the groove 112 and the stop pin 122; the groove 114 and the stops 118, 119; the groove 112 and the stop means 118 and 119; the groove 114 and the stop pin 122, and so on, to provide the sequence of projected positions of the cassette carriage required for the exposure of light sensitive material in the manner indicated in Fig. 25.

Positioning of the cassette carriage 74 successively to permit the exposure of light sensitive material as shown in Fig. 28, may be accomplished by adjusting the mechanism in the manner illustrated in Figs. 23 and 24, and by also adjusting the handle 150 to retract the roller 155 from the cam 161 and thus present the pin 121 in carriage stopping position. When so adjusted, the carriage 74 will be guided into the picturing station alternately by the grooves 112 and 114, but each projection of the cassette carriage will be stopped in longitudinally centered position by action of the pin 121.

As shown more particularly in Figs. 17, 18, and 20 of the drawings, visual means may be provided for showing the adjusted position of the selector mechanism. To this end, the graduated dial 165 is fixed on and turns with the cam 161 and the index and gear wheels 162 and 163, and consequently may reveal the condition thereof through the window opening 166. For use in conjunction with the dial 165, a screening plate 211 may be mounted on the cam lever 154 in position to screen the dial 165 in the opening 166, when said lever 154 is in the camming position shown in Fig. 18, the screen 211 being retracted from dial screening position when the cam lever 154 is retracted to allow the cam 161 to control the lever system 123. By forming suitable openings 212 in the screen member 211, the dial may be caused to reveal the operating condition of the control mechanism in each of its possible settings.

In operating the foregoing apparatus for fluoroscopic examination, it is ordinarily necessary to energize the source of X-rays at an intensity level substantially lower than the level at which the ray source must be operated in the making of X-ray pictures on the film 129. Furthermore, when in operation for fluoroscopic examination, it is desirable that external illumination of visible light be eliminated. To this end, a control switch 213 may be mounted in convenient position, as at the forward end of the casing 47. This switch, as indicated in Fig. 30, may conveniently comprise a double-pole, double-throw switch, connected with conductors 214 which may extend within the housing 47, as along a side wall thereof, to a terminal block 215 for interconnection with suitable cable means passing outwardly of the housing 47 through the opening 109. A microswitch 216 may also be mounted within the housing 47, as on the rear wall 51 thereof, in position to be actuated by the cam following roller 82 when the carriage structure is in retracted position. This microswitch may be connected with the terminal block 215, and thence by cable outwardly of the casing 47.

The microswitch 216, as shown in Fig. 30, may be interconnected to control the level at which the X-ray source is energized, whereby, so long as the carriage structure is in retracted position, the X-ray source may produce rays of a desired intensity for excitation of the fluorescent panel 60. As soon as the carriage structure is released for projecting movement toward the picturing station, by operation of the push button 105, the cam follower 82 will release the switch 216, whereby to energize the light source at a level required for exposure of the light sensitive material 129.

One pole of the control switch 213, when the switch is thrown in one direction, may be interconnected to control the operation of the X-ray source. The other pole of said switch may be connected to control the operation of external illumination, such as provided by a ceiling lamp 217, in a room containing the apparatus of the present invention, as well as a dial light 218, which may be mounted in a suitable holder disposed within the housing 47 opposite the indicator window 166 and behind the dial 165. By means of the switch 213, all visible lights may be extinguished whenever the X-ray source is in operation, either for fluoroscopic or radiographic examination purposes; but the light sources may be instantly energized by means of said switch whenever required.

Accordingly, the operator of the mechanism may conduct fluoroscopic examination, with lights extinguished, by means of the screen 60. Having previously adjusted the selector mechanism by means of the knob 149 and handle 150, the operator may almost instantly make a radiographic picture of the object under fluoroscopic examination, merely by pressing the release button 105 to project the film carriage, and thereafter actuating a suitable switch, such as a foot switch, in order to make the necessary X-ray exposure, after the carriage 74 has reached its projected position in the exposure area. By alternately pressing the button 105 and returning the carriage mechanism to retracted position after an exposure has been made, by pushing on the handle 97 a series of pictures of the sort shown in Figs. 25, 26, and 28, may be made on a single sheet of light sensitive material, or the entire area of the material may be exposed in the fashion indicated in Fig. 27, depending, of course, upon the setting of the control handles 149 and 150.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. The combination, with a support for an examination object, of carrying means for supporting an X-ray sensitive fluorescent screen at a picturing station, on one side of an examination object on said support, mounting means for supporting an X-ray source in position to direct an X-ray beam through said examination object and upon the screen at said station, said carrying means comprising a mounting frame forming said picturing station and supporting said screen, and a carriage structure for supporting X-ray sensitive photographic material on said mounting frame, said carriage structure being longitudinally shiftable on the mounting frame between retracted and projected positions, respectively supporting the material outwardly of and at the picturing station, between said screen and said X-ray source, means comprising a plurality of laterally offset guide tracks for guiding the carriage structure to present the sensitive material selectively in any one of a number of laterally offset positions at the picturing station, and selectively operable stop means for determining the longitudinally offset position of the sensitive material as presented at the picturing station.

2. The combination, with a support for an examination object, of carrying means for supporting an X-ray sensitive fluorescent screen at a picturing station, on one side of an examination object of said support, mounting means for supporting an X-ray source in position to direct an X-ray beam through said examination object and upon the screen at said station, said carrying means comprising a mounting frame forming said picturing station and supporting said screen, and a carriage structure for supporting X-ray sensitive photographic material on said mounting frame, said carriage structure being shiftable on the mounting frame between retracted and projected positions, respectively supporting the material outwardly of and at the picturing station, said support for the examination object comprising a table structure providing a table top, and said carrying and mounting means being supported on opposite sides of said table top, on a common support frame movable laterally and longitudinally of the table structure, said carrying means being shiftable on said support frame between operating position presenting said picturing station in centered alinement with the X-ray beam, and retracted position outwardly of the path of said beam.

3. The combination, with a support for an examination object, of carrying means for supporting an X-ray sensitive fluorescent screen at a picturing station, on one side of an examination object on said support, mounting means for supporting an X-ray source in position to direct an X-ray beam through said examination object and upon the screen at said station, said carrying means comprising a mounting frame forming said picturing station and supporting said screen, and a carriage structure for supporting X-ray sensitive photographic material on said mounting frame, said carriage structure being shiftable on the mounting frame between retracted and projected positions, respectively supporting the material outwardly of and at the picturing station, said support for the examination object comprising a table structure providing a table top, and said carrying and mounting means being supported on opposite sides of said table top, on a common support frame movable laterally and longitudinally of the table structure, said carrying means being shiftable on said support frame toward and away from said table top while maintaining said picturing station in alinement with the X-ray beam.

4. The combination, with a support for an examination object, of carrying means for supporting an X-ray sensitive fluorescent screen at a picturing station, on one side of an examination object on said support, mounting means for supporting an X-ray source in position to direct an X-ray beam through said examination object and upon the screen at said station, said carrying means comprising a mounting frame forming said picturing station and supporting said screen, and a carriage structure for supporting X-ray sensitive photographic material on said mounting frame, said carriage structure being shiftable on the mounting frame between retracted and projected positions, respectively supporting the material outwardly of and at the picturing station, adjustable shutter means for regulating the sectional shape and area of the X-ray beam at said exposure station, and control means manually operable on said mounting frame, adjacent said picturing station, for adjusting said shutters.

5. The combination, with a support for an examination object, of carrying means for supporting an X-ray sensitive fluorescent screen at a picturing station, on one side of an examination object on said support, mounting means for supporting an X-ray source in position to direct an X-ray beam through said examination object and upon the screen at said station, said carrying means comprising a mounting frame forming said picturing station and supporting said screen, and a carriage structure for supporting X-ray sensitive photographic material on said mounting frame, said carriage structure being shiftable on the mounting frame between retracted and projected positions, respectively supporting the material outwardly of and at the picturing station, and switch means operable when said carriage means is in retracted and projected positions, respectively, to condition the X-ray source for fluoroscopic excitation of the screen and for photographic excitation of sensitive material.

6. Apparatus for serialographic purposes comprising a mounting frame forming a picturing station, a carriage structure for supporting picture ray sensitive material on said mounting frame, said carriage structure being longitudinally shiftable on the mounting frame between retracted and projected positions, respectively supporting the sensitive material outwardly of and at the picturing station, means comprising a plurality of laterally offset guide tracks for guiding the carriage structure to present the sensitive material selectively in any one of a number of laterally offset positions at the picturing station, and means to stop the carriage structure in longitudinally projected position at the picturing station.

7. Apparatus as set forth in claim 6, including a cam follower on said carriage structure and adapted to selectively engage said guide tracks, to determine the laterally offset position of the sensitive material as presented at the picturing station, and means selectively operable, when the carriage structure is in retracted position, to guide the cam follower into engagement with a selected one of said guide tracks, upon subsequent release of the carriage for projection to the picturing station.

8. Apparatus as set forth in claim 6, wherein said carriage structure comprises a sub-carriage longitudinally movable in a predetermined path between retracted and projected position, a material carriage for receiving the sensitive material and mounted for movement on the sub-carriage in a direction transversely of the longitudinal movement of the sub-carriage, and a cam follower on said material carriage and adapted selectively to engage said guide tracks, to determine the laterally offset position of said carriage when in projected position at said picturing station.

9. Apparatus as set forth in claim 6, including a cam follower on said carriage structure and adapted to selectively engage said guide tracks, to determine the laterally offset position of the sensitive material as presented at the picturing station, means selectively operable, when the carriage structure is in retracted position, to guide the cam follower into engagement with a selected one of said guide tracks, upon subsequent release of the carriage for projection to the picturing station, said selectively operable means comprising a pivoted gate member for receiving said cam follower, and means to swing said gate member selectively into position to guide the follower into a selected one of said guide tracks.

10. Apparatus as set forth in claim 6, including a cam follower on said carrriage structure and adapted to selectively engage said guide tracks, to determine the laterally offset position of the sensitive material as presented at the picturing station, means selectively operable, when the carriage structure is in retracted position, to guide the cam follower into engagement with a selected one of said guide tracks, upon subsequent release of the carriage for projection to the picturing station, said selectively operable means comprising a pivoted gate member for receiving said cam follower, and means to swing said gate member selectively into position to guide the follower into a selected one of said guide tracks, comprising a rotatable driving member connected with said gate member to reciprocably swing the same between the limits of its operating movement in response to rotation of said driving member.

11. Apparatus for serialographic purposes comprising a mounting frame forming a picturing station, a carriage structure for supporting picture ray sensitive material on said mounting frame, said carriage structure being longitudinally shiftable on the mounting frame between retracted and projected positions, respectively supporting the sensitive material outwardly of and at the picturing station, means forming a plurality of laterally offset guide tracks for guiding said carriage structure in any selected one of a plurality of laterally offset paths into said picturing station, and selectively operable stops to halt the structure in any selected one of a number of longitudinally offset positions.

12. Apparatus as set forth in claim 11, including guide track selecting and stop actuating mechanism, and means selectively operable, when the carriage is in retracted position, to condition the guide track selecting and stop actuating mechanism for the operation of a selected stop and the selection of a track in response to subsequent release of the carriage structure for projection to the picturing station.

13. Apparatus as set forth in claim 11, wherein said selectively operable stops include means forming sets of cooperating stops on the mounting frame and on the carriage structure for stopping the structure in predetermined positions of longitudinal projection, shiftable lever means operable to selectively present at least some of said stops in active or stopping and in inactive or non-stopping position, and selector means on said mounting frame for actuating said lever means.

14. Apparatus for serialographic purposes comprising a mounting frame forming a picturing station, a carriage structure for supporting picture ray sensitive material on said mounting frame, said carriage structure being longitudinally shiftable on the mounting frame between retracted and projected positions, respectively supporting the sensitive material outwardly of and at the picturing station, means to guide said longitudinal projecting movement of the carriage structure in a predetermined path into said picturing station, and selectively operable stops to halt the structure in any selected one of a number of longitudinally offset positions, said selectively operable stops including shiftable stop elements, lever means to selectively move said stop elements into and out of active stopping position, and an adjustable cam for moving said lever means to determine the shifted position of said stop elements.

15. Apparatus for serialographic purposes comprising a mounting frame forming a picturing station, a carriage structure for supporting picture ray sensitive material on said mounting frame, said carriage structure being longitudinally shiftable on the mounting frame between retracted and projected positions, respectively supporting the sensitive material outwardly of and at the picturing station, means to guide said longitudinal projecting movement of the carriage structure in a predetermined path into said picturing station, and selectively operable stops to halt the structure in any selected one of a number of longitudinally offset positions, said selectively operable stops including shiftable stop elements, lever means to selectively move said stop elements into and out of active stopping position, and an adjustable cam for moving said lever means to determine the shifted position of said stop elements, said cam comprising a rotatable cam element adapted to adjust said lever means to desired positions of successive adjustment in response to progressive rotary movement of the cam element.

16. Apparatus for serialographic purposes comprising a mounting frame forming a picturing station, a carriage structure for supporting picture ray sensitive material on said mounting frame, said carriage structure being longitudinally shiftable on the mounting frame between retracted and projected positions, respectively supporting the sensitive material outwardly of and at the picturing station, means comprising a plurality of laterally offset guide tracks for guiding the carriage structure to present the sensitive material selectively in any one of a number of laterally offset positions at the picturing station, means to stop the carriage structure in longitudinally projected position at the picturing station, comprising selectively operable stops to halt the structure in any selected one of a number of longitudinally offset positions at the picturing station, and selector means operable to select any desired one of said guide tracks and any desired one of said stops for the guidance of said carriage structure into and the stoppage thereof, at said picturing station, in desired laterally and longitudinally adjusted position.

17. Apparatus as set forth in claim 16, wherein said selector means comprises a pivoted gate for receiving a cam follower on the carriage structure, a rotatable driving member for swinging the gate into position to guide the follower into a selected one of said guide tracks, a rotary cam for adjusting said stops to desired positions of successive adjustment in response to progressive rotation of said cam, and driving means connecting with the rotary cam and the driving member for adjusting movement thereof in unison to simultaneously adjust the gate and the stops.

18. Apparatus as set forth in claim 16, wherein said selector means comprises a pivoted gate for receiving a cam follower on the carriage structure, a rotatable driving member for swinging the gate into position to guide the follower into a selected one of said guide tracks, a rotary cam for adjusting said stops to desired positions of successive adjustment in response to progressive rotation of said cam, driving means connecting with the rotary cam and the driving member for adjusting movement thereof in unison to simultaneously adjust the gate and the stops, and means to advance said driving means progressively in response to successive retraction of the carriage structure to retracted position.

ROBERT J. MUELLER.
     IVAN BURGESON.

REFERENCES CITED

The following references are of record in the file of this patent:

UNITED STATES PATENTS

| Number | Name | Date |
|---|---|---|
| 2,208,258 | Grobe | July 16, 1940 |
| 2,327,603 | Kizaur | Aug. 24, 1943 |
| 2,468,381 | Sussin | Apr. 26, 1949 |